M. BANOWETZ.
LAWN MOWER.
APPLICATION FILED JAN. 20, 1911.
1,049,194.
Patented Dec. 31, 1912.
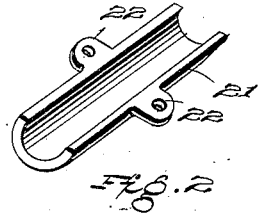
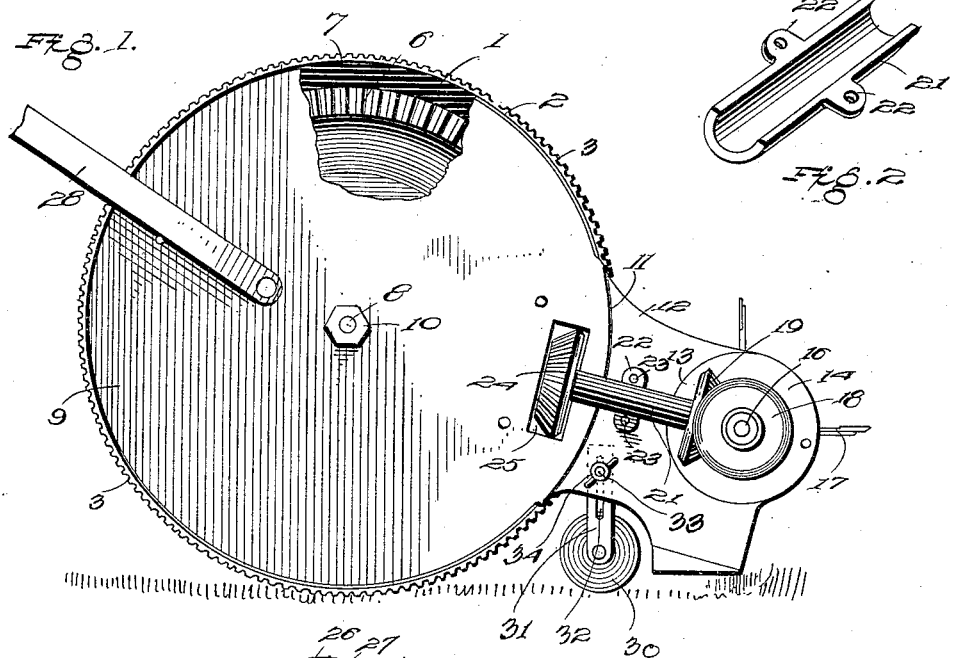
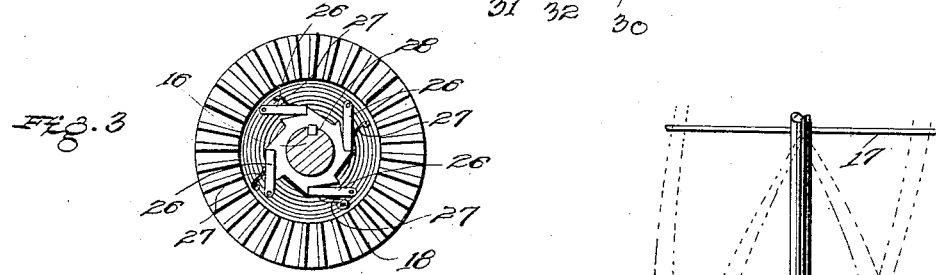
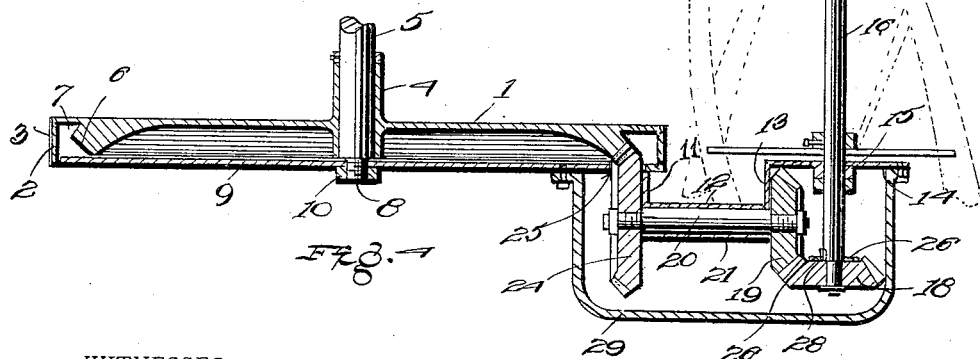
WITNESSES
INVENTOR
Mike Banowetz.

UNITED STATES PATENT OFFICE.

MIKE BANOWETZ, OF COFFEYVILLE, KANSAS.

LAWN-MOWER.

1,049,194.

Specification of Letters Patent.  Patented Dec. 31, 1912.

Application filed January 20, 1911. Serial No. 603,746.

*To all whom it may concern:*

Be it known that I, MIKE BANOWETZ, a citizen of the United States, residing at Coffeyville, in the county of Montgomery and State of Kansas, have invented certain new and useful Improvements in Lawn-Mowers, of which the following is a specification, reference being had therein to the accompanying drawing.

This invention relates to lawn mowers and has for its object to provide an improved lawn mower in which the number of operative parts is reduced and simplified, thereby rendering the machine very effective.

The invention further has for its object to provide an improved lawn mower in which a small number of operative parts are employed and are so constructed and arranged that the relative position of the parts forms a compact whole.

The invention further has for its object to provide an improved lawn mower in which the cutting blades are prevented from rotating backward.

Referring to the accompanying drawings: Figure 1 is a side view of a lawn mower, partly broken away, and with the casing covering the operating mechanism removed. Fig. 2 is a detail view in perspective of a detachable bearing employed with the machine. Fig. 3 is an enlarged detail view of a beveled gear wheel provided with means for preventing it from running backward. Fig. 4 is a plan view in horizontal section, with parts broken away, showing the operative mechanism of the machine.

In the construction of this invention, each of the driving wheels is formed with a plate 1 in the form of a disk having its periphery provided with an annular flange extending in a direction away from the remaining wheels 2 on the outer surface of which are teeth 3 to enable the wheel to engage the ground and aid in the traction produced thereby. The disk 1 is formed with a central tubular sleeve 4 projecting on each side of the plate 1 and serving as a bearing for driving shaft 5. The inner surface of the plate 1 is formed adjacent to the annular flange 2 with a beveled gear 6 located at a slight distance from the flange 2 to form a space 7 for a purpose hereinafter to be explained. Mounted on the reduced portion 8 of the shaft 5 is a metallic plate 9 secured in place by means of a nut 10 on the reduced portion 8 of the shaft, the plate 9 inclosing a space between it and the disk 1. The plate 9 is extended and formed with a bent portion 11 at one side of the plate and at a right angle thereto, and is then formed with a forwardly extending portion 12 and with the portion 13 at a right angle to the portion 12 forming a pocket for the passage of the ends of the cutters of the machine as hereinafter set forth. The plate is still further extended from the portion 13 by means of the portion 14 on which is mounted a bearing 15 through which extends a shaft 16 of the cutter bar mechanism 17, the cutter bars being shown in dotted lines. Mounted on the end of the shaft 16 is a beveled gear wheel 18 which meshes with a beveled gear wheel 19 mounted on one end of a shaft 20, held in place by a bearing or semi-circular sleeve 21 provided with lips 22 by means of which it is detachably secured to the portion 12 of the plate by means of screws 23. Mounted on the other end of the shaft 20 is a beveled gear wheel 24 which projects through an opening 25 in one side of the plate 9 adjacent to one of the flanges 3, said wheel 24 meshing with the beveled gear 6 on the disk 1, the space 7 between the gear 6 and the flange 11 permitting of the location and the movement of the periphery of the wheel 24 in said space.

It will be seen that by means of the foregoing construction and arrangement of parts that the operative mechanism of the machine is very compactly arranged, the machine from front to rear being foreshortened, and the pocket formed by the angular portions of the plate permitting of the movement therethrough of the ends of the cutters. It will be seen moreover that not only are operative parts of this machine compactly arranged but that a very small number of parts are employed which not only simplifies the machine and reduces the cost thereof, but which also renders the machine very effective in that the power of the driving wheels is directly communicated to the shaft of the cutting mechanism.

In order to prevent the cutters from being moved backward and at the same time permit of their freely rotating in the opposite direction, suitable means are provided for that purpose and preferably by means of the device shown in Fig. 3, consisting of a number of pivoted pawls 26 mounted on the gear 18 and normally held in place by means of springs 27 with a ratchet wheel 28 mounted on the shaft 16. It will be seen that by means of this construction that as the machine is moved backward the pawl 26 will slip over the ratchet wheel 28 and any reverse movement of the shaft 10 will be prevented as said pawls do not engage the ratchet wheel 20 thereby preventing the cutters from being moved backward. The beveled gear wheel mechanism connecting each driving wheel with each end of the cutter shaft is covered by means of a casing 29, shown in horizontal section in Fig. 4.

In order to raise and lower the front of the machine and hold it in adjusted position, a roller 30 is provided extending transversely beneath the machine and between the driving rollers and the cutters, and having vertical supporting arms 31 extending up against each side of the frame of the forward end of the machine, each of said arms having a vertical slot 32 through which extends a pin 33 upon which is mounted an adjusting nut 34 whereby the forward end of the machine may be raised and lowered on the arms 31.

Having described the invention, what I claim is:

In a lawn mower, a driving wheel formed of a disk-shaped plate having an annular flange, said plate having on the face from which said flange projects a bevel gear, a driving shaft whereon said wheel is mounted, a plate mounted on the end of the driving shaft, and forming a closure for the open portion of the driving wheel, said plate being extended forwardly from said driving wheel, and being provided with a concave portion forming a half bearing, said plate being further extended forwardly from said half bearing and provided with a bearing opening, said plate further having an opening adjacent its forward periphery, a shaft held in said half bearing, a cap covering said shaft and attached to said plate to form the bearing cap, a gear on said shaft meshing with the gear on the driving wheel, a cutter bar shaft extending through the bearing in the plate, meshing gears mounted on the cutter bar shaft and the shaft held in the bearing of the plate, and a cover inclosing the last-mentioned gears.

In testimony whereof I hereunto affix my signature in presence of two witnesses.

MIKE BANOWETZ.

Witnesses:
PHILIP H. CASS,
N. W. MURPHY.